Dec. 9, 1947.     T. B. STETZER     2,432,257
FASTENING MEANS
Filed March 6, 1944
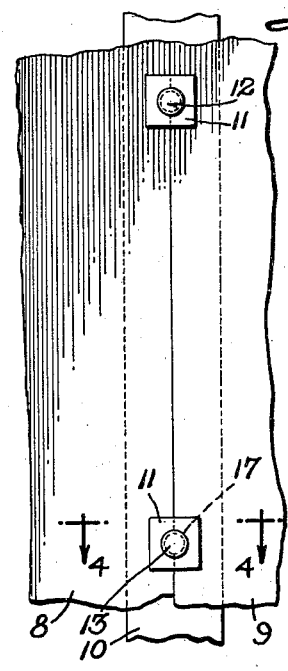
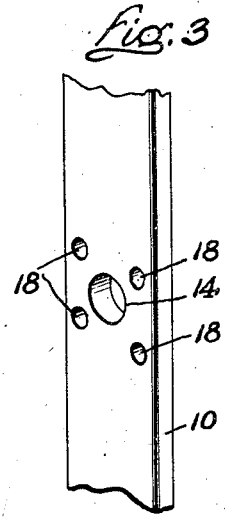
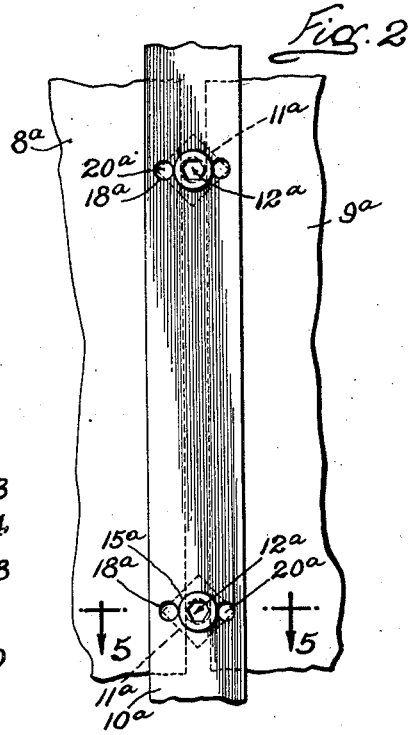
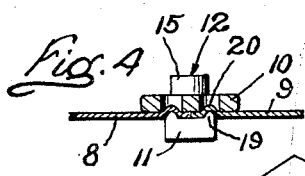
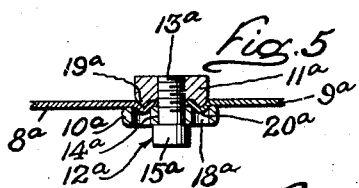
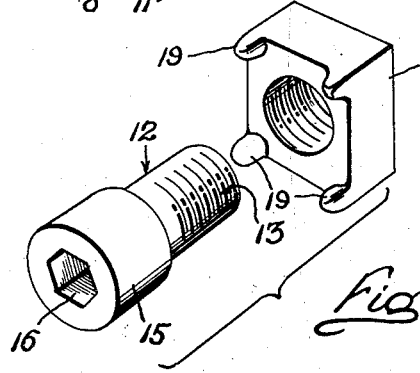
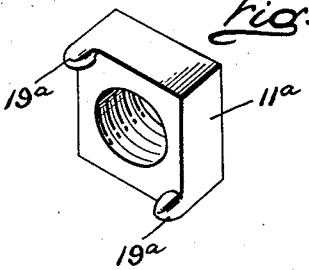
INVENTOR
Theodore B. Stetzer
By Carlson, Pitzner, Hatfield & Wolfe
ATTORNEYS Patented Dec. 9, 1947

2,432,257

UNITED STATES PATENT OFFICE 2,432,257

FASTENING MEANS

Theodore B. Stetzer, Chicago, Ill.

Application March 6, 1944, Serial No. 525,197

7 Claims. (Cl. 189—36)

The present invention relates generally to improvements in fastening means for joining or connecting separate units of sheet material edge to edge in rigid assembled relation, and particularly to new and improved means for connecting prefabricated panels in the construction of shields, guards and the walls of utility buildings, such as metal garages, hog houses, hen houses, etc.

One of the objects of the present invention is to provide a novel fastening means of the foregoing character which is simple and inexpensive in construction, which is easy and quick to apply and which affords a strong and rigid juncture.

Another object is to provide a new and improved fastening means which in being applied will upset portions of the sheet material adjacent the marginal edges to provide a secure connection, but which will not perforate, break or rupture the material.

Further objects and advantages will become apparent as the description proceeds.

In the accompanying drawings,

Figure 1 is a fragmentary plan view of one form of fastening means embodying the features of the invention.

Fig. 2 is a fragmentary plan view of a modified form of the fastening means.

Fig. 3 is a fragmentary perspective view of a clamping strip forming part of the form of Fig. 1.

Figs. 4 and 5 are transverse sectional views taken respectively along lines 4—4 and 5—5 of Figs. 1 and 2.

Fig. 6 is an exploded perspective view, on an enlarged scale, of a nut and bolt forming part of the form of Fig. 1.

Fig. 7 is a perspective view on an enlarged scale of a nut forming part of the form of Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the fastening means is adapted to join or connect separate units of sheet material edge to edge rigidly and securely in assembled relation. In Fig. 1, two thin sheets 8 and 9 are connected with their adjacent marginal edges in close abutting relation. The sheets 8 and 9 may be made of any suitable material, such for example as metal or plastics, and may be formed in prefabricated panels of any desired shape and size depending on the purpose for which they are intended. Such sheets are commonly prefabricated panels adapted to be joined or connected to form the walls of sectional buildings (not shown), such for example as metal garages, hog houses, hen houses and other building structures. They are also adapted for use in forming guards, shields and other similar devices assembled from panels or sections of sheet material.

The fastening means of Figs. 1, 3, 4 and 6, which constitutes one exemplary embodiment of the invention, comprises a long narrow strap 10 of rigid material, preferably metal, which extends along and overlies the marginal edge portions of the sheets 8 and 9 to be joined or connected. The strap 10 preferably is made of flat strip material and constitutes a base clamping plate or element lying flat against one side of the sheets or panels 8 and 9. Disposed against the other side of the sheets or panels 8 and 9 is a flat clamping plate or head 11. A plurality of such heads may be provided in suitable spaced relation along the strap 10 depending on the particular requirements in each instance. Each of the heads 11 constitutes an opposed clamping element.

Each of the heads 11 is separately and removably connected to the strap 10 by screw means. The screw means is adjustable to draw the head 11 toward the strap 10, and thus tighten the head against the sheets or panels 8 and 9. As a result, the sheets are tightly clamped in assembled relation between the strap or base clamping element 10, and the head or opposed clamping element 11.

The screw means comprises two screw elements in threaded engagement. The head 11 constitutes or forms part of one of these elements. The other element 12 is in bearing engagement with the outer or exposed side of the strap or plate 10. In the present instance, the head 11 is provided in the form of a square nut, and the other screw element 12 consists of a bolt having a threaded shank 13 extending through a closely fitting hole 14 in the strap 10 into engagement with the nut, and having a head 15 bearing against the strap. The head 15 is formed with a socket 16 to receive a hand tool (not shown) for turning the bolt 12. When the adjacent edges of the sheets 8 and 9 are positioned in close abutting relation, as in Fig. 1, they are suitably notched or formed with semi-circular recesses, as at 17, to fit about the bolt shank 13.

To render the clamp positive and secure against separation of the sheets 8 and 9, one of the clamping elements is formed with a suitable number of recesses or apertures 18, and the other clamping element is formed with a like member of similarly spaced projections 19 adapted upon tightening of the screw means to form indentations 20 in the sheet material projecting into the recesses 18. Preferably, the recesses 18 are formed in the strap 10, and the projections 19 are provided on the inner face of the head or nut 11. In the present instance, four recesses 18 are provided, and they open through opposite side portions of the strap 10 in uniformly spaced relation about the bolt hole 14. The recesses 18 at opposite sides of the hole 14 are spaced inwardly respectively from the joined edges of the sheets 8 and 9, it being understood that at least one recess should underlie each sheet. The cooperative projections 19 correspond in number and spacing to the recesses 18, but are smaller in diameter to allow for the thickness of the sheet material. In the present instance, the projections 19 are located at and integral with the four corners of the nut 11, and the points thereof are blunt and rounded so that in forming the indentations 20 they will not perforate, break or rupture the sheet material.

It will be evident that the clamping pressure between the strap 10 and the nut 11, and the positive interlock afforded by the indentations 20, serve to connect the sheets 8 and 9 tightly and securely in assembled relation. The indentations 20 are positively maintained by the projections 19, and act positively to prevent separation of the sheets 8 and 9. Since the sheets 8 and 9 are indented without being perforated or broken, the strength of the sheet material is not impaired, and the connection will withstand heavy stresses.

The fastening means can be easily and quickly applied, and is simple and inexpensive in construction. The number and spacing of the nuts 11 are determined by the requirements of the work, such for example as the strength of the sheet material and the stresses and strains to which it is likely to be exposed in use. For example, the clamps may be spaced approximately one foot apart for walls, and approximately two feet apart for ceilings, and the strap 10 may be continuous or in short sections.

In the modified form of Figs. 2, 5 and 7, two sheets 8a and 8b are connected with their adjacent edges in spaced relation, the space therebetween however being closed by the strap 10a. The fastening means is generally similar to the first form, and hence corresponding parts thereof are identified by the same reference numerals as in the first form plus the letter a. In this form, the bolt shanks 13a extend through the space between the sheets 8a and 8b, so that the latter need not be recessed as at 17 in Fig. 1.

In view of the space between the sheets 8a and 8b, and the correspondingly greater distance required between the indentations 20a to space them inwardly from the marginal edges, the clamping means is provided with an increased spread. This may be accomplished with a nut 11a, of the same size as the nut 11, by providing only two projections 19a at diagonally opposite corners, and locating the nut in a diagonal or inclined position. Consequently, the strap 10a is formed with only two recesses 18a suitably spaced to interfit with the projections 19a of each nut 11a.

I claim as my invention:

1. A fastening device comprising, in combination, a strap constituting a base clamping element and a nut constituting an opposed clamping element, said elements being adapted to receive and clamp therebetween two units of sheet material in abutting edge to edge relation, a bolt for tightening said elements and comprising a head engaging the outer side of said strap and a shank extending through said strap into threaded engagement with said nut, said strap being formed with four apertures opening therethrough in pairs at opposite sides and adapted to underlie said sheet units at points spaced inwardly from the edges, and four projections formed respectively on the inner face of said nut at the four corners thereof and adapted to interfit with said apertures, whereby when said bolt is tightened to clamp said sheet units between said strap and said nut, said projections will indent the sheet material into said apertures to provide a secure interlock without rupturing the material.

2. A fastening device comprising, in combination, a strap constituting a base clamping element and a nut constituting an opposed clamping element, said elements being adapted to receive and clamp therebetween two units of sheet material in abutting edge to edge relation, a bolt for tightening said elements and comprising a head engaging the outer side of said strap and a shank extending through said strap into threaded engagement with said nut, said strap being formed with a plurality of recesses at opposite sides and so spaced that at least one recess is adapted to underlie each sheet unit at a point spaced inwardly from the associated edge, and a plurality of projections formed on the inner face of said nut and adapted to cooperate with said apertures, whereby when said bolt is tightened to clamp said sheet units between said strap and said nut, said projections will indent the sheet material into said recesses to provide a secure interlock without rupturing the material.

3. A fastening device comprising, in combination, a strap constituting a base clamping element and a nut constituting an opposed clamping element, said elements being adapted to receive and clamp therebetween two units of sheet material in parallel spaced edge to edge relation, a bolt for tightening said elements and comprising a head engaging the outer side of said strap and a shank extending through said strap and between said units into threaded engagement with said nut, said strap being formed with two apertures opening therethrough respectively at opposite sides and adapted to underlie said sheet units at points spaced inwardly from the edges, and two projections formed respectively on the inner face of said nut at diagonally opposite corners and adapted to cooperate with said apertures, whereby when said bolt is tightened to clamp said sheet units between said strap and said nut, said projections will indent the sheet material into said apertures to provide a secure interlock without rupturing the material.

4. A fastening device comprising, in combination, a strap constituting a base clamping element and a nut constituting an opposed clamping element, said elements being adapted to receive and clamp therebetween two units of sheet material in edge to edge relation, a bolt for tightening said elements and comprising a head engaging the outer side of said strap and a shank extending through said strap into threaded engagement with said nut, said strap being formed with two recesses adapted respectively to underlie said sheet units at points spaced inwardly from the edges, and two projections formed respectively on the inner face of said nut at the diagonally opposite corners and adapted to cooperate with said recesses, whereby when said bolt is tightened to clamp said sheet units between said strap and said nut, said projections will indent the sheet material into said recesses to provide a secure interlock without rupturing the material.

5. A fastening device comprising, in combination, a base clamping element, an opposed clamping element, said elements being adapted to receive therebetween and to clamp two units of sheet material in abutting edge to edge relation, screw means for tightening said elements, said screw means comprising a nut screw element and a bolt screw element extending through said base clamping element, said opposed clamping element constituting one of said screw elements, the other of said screw elements bearing against said base clamping element, one of said clamping elements being formed with two recesses in opposite side portions respectively to underlie said units at points spaced inwardly from the adjacent edges thereof, and projections on the clamping face of the other of said clamping elements adapted to cooperate with said recesses and to indent said sheet material without rupturing into said recesses upon the application of clamping pressure.

6. A fastening device comprising, in combination, a base clamping element, an opposed clamping element, said elements being adapted to receive therebetween and to clamp two units of sheet material in edge to edge relation, screw means for tightening said elements, said screw means comprising a nut screw element and a bolt screw element extending through said base clamping element, said opposed clamping element constituting one of said screw elements, the other of said screw elements bearing against said base clamping element, one of said clamping elements being formed with four spaced recesses in opposite side portions respectively to underlie said units at points spaced inwardly from the adjacent edges thereof, and four projections on the clamping face of the other of said clamping elements adapted to cooperate with said recesses and to indent said sheet material without rupturing into said recesses upon the application of clamping pressure.

7. A fastening device comprising, in combination, an elongated base clamping element, a series of spaced opposed clamping elements, said elements being adapted to receive therebetween and to clamp two units of sheet material in edge to edge relation, a plurality of screw means for tightening said elements, each screw means comprising a nut screw element and a bolt screw element extending through said base clamping element, each opposed clamping element constituting one of said screw elements, the other of said screw elements bearing against said base clamping element, said base clamping element being formed with sets of two recesses each in opposite side portions respectively to underlie said units at points spaced inwardly from the adjacent edges thereof, and projections on the clamping face of each opposed clamping element adapted to cooperate with the recesses of an associated set and to indent said sheet material without rupturing into said recesses upon the application of clamping pressure.

THEODORE B. STETZER.

REFERENCES CITED

The following references are of record in the file of this patent:

UNITED STATES PATENTS

| Number | Name | Date |
|---|---|---|
| D. 114,184 | Hobson | Apr. 11, 1939 |
| 2,073,467 | Demboski et al. | Mar. 9, 1937 |
| 1,511,607 | Hamby | Oct. 14, 1924 |
| 1,242,202 | Keller | Oct. 9, 1917 |
| 1,957,933 | Brandi | May 8, 1934 |
| 2,017,629 | Lindsay | Oct. 15, 1935 |
| 2,210,697 | Wilson | Aug. 6, 1940 |
| 1,702,870 | Jackson | Feb. 19, 1929 |